Figure 1:
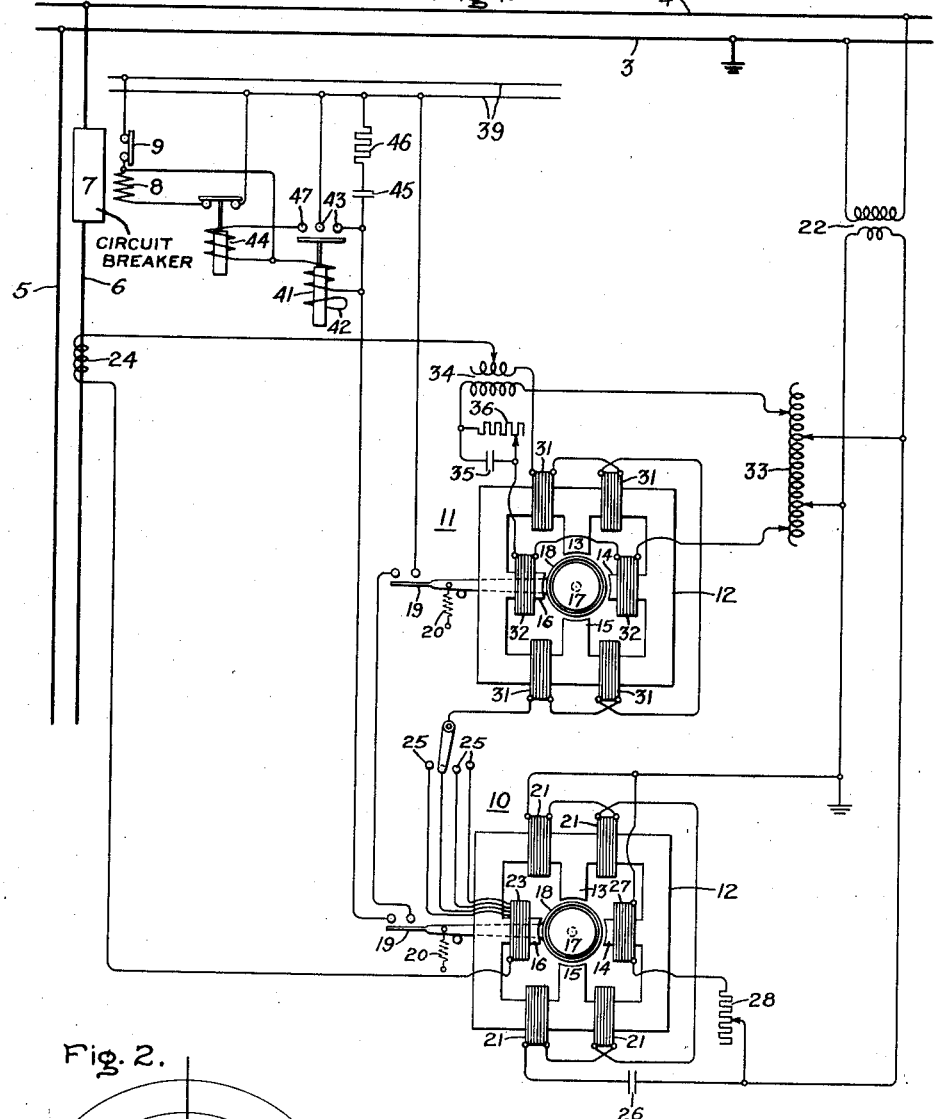

April 26, 1938.  O. C. TRAVER  2,115,597

PROTECTION OF ELECTRIC SYSTEMS

Filed Dec. 8, 1936

Inventor:
Oliver C. Traver,
by Harry E. Dunham
His Attorney.

Patented Apr. 26, 1938

2,115,597

UNITED STATES PATENT OFFICE 2,115,597

PROTECTION OF ELECTRIC SYSTEMS

Oliver C. Traver, Drexel Hill, Pa., assignor to General Electric Company, a corporation of New York Application December 8, 1936, Serial No. 114,765

14 Claims. (Cl. 175—294)

My invention relates to improvements in the protection of electric systems and more particularly to the protection of electric circuits embodying circuit breakers whose opening is desired on the appearance of faulty circuit conditions and more especially circuit breakers whose opening is dependent on the rate of change of an electric quantity of the circuit. One object of my invention is to provide improved protective apparatus which is so highly selective as to insure the opening of the circuit to be protected only on the occurrence of faulty circuit conditions. Another object of my invention is to insure the opening of the circuit in case of faults, if the opening of the circuit breaker is dependent on the rate of change of an electric quantity of the circuit and the circuit breaker fails to open because the rate of change of such quantity is insufficient to effect the opening operation and also in case of electrical failure of the rate-of-change mechanism.

High speed circuit breakers whose opening is dependent on the rate of change of an electric quantity such as current are well-known to the art. A form adapted for direct current circuits is disclosed, for example, in United States Letters Patent Reissue 15,441, of J. F. Tritle, dated August 29, 1922, and a form adapted for alternating current circuits is disclosed in United States Letters Patent 1,756,924, of J. W. McNairy, dated April 29, 1930. Such circuit breakers are often designated impulse-trip circuit breakers and they are commonly used for the protection of electric railway trolley circuits. When so used, it is frequently necessary to set the trip for a high rate of change of current in order to prevent false tripping due to the probability of starting several trains at the same time and due also to transient magnetizing or inrush currents upon closing a circuit breaker after a fault has been cleared. These transient currents are apt to be very large, especially when a frequency as low as twenty-five cycles is used, and the iron in the locomotive transformer is kept at a minimum in order to reduce the locomotive weight. The bouncing of the pantograph also accentuates transients. However, if the circuit breaker trip is set high enough to avoid opening under such conditions, there is the possibility of its failing to open under real fault conditions in which the rate of rise of fault current is insufficient to insure a tripping operation. In other words, the circuit breaker would not operate to open the circuit and clear the fault when it should be cleared, with consequent hazard to the circuit and connected apparatus. To eliminate such hazard, a higher degree of discrimination between faults and loads than that afforded by the circuit breaker alone is necessary. This discrimination is more difficult to obtain because of the variability of load or train position as well as fault position. In accordance with my invention I provide an arrangement for obtaining such discrimination whereby to insure the opening of the circuit breaker only under actual fault conditions, in which the rate of rise of current is insufficient to trip the circuit breaker, without interfering with the normal operation of the circuit breaker in those cases where the rate of increase of current is insufficient to insure tripping. In other words, sufficient time is allowed for the impulse-trip to function if it can, and then, if a fault is indicated and the circuit breaker has not tripped, it will be opened. Also in accordance with my invention, any electrical failure in the circuit breaker trip will not prevent the opening of the circuit breaker after the operation of the impulse-trip time.

My invention will be better understood from the following description, when considered in connection with the accompanying sheet of drawings, and its scope will be pointed out in the appended claims.

Figure 2:
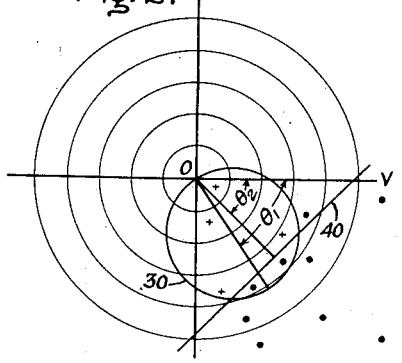

In the accompanying drawing, Fig. 1 illustrates diagrammatically protective apparatus embodying my invention, and Fig. 2 is a relay characteristic diagram explanatory of the embodiment of my invention shown in Fig. 1.

In the embodiment of my invention shown in Fig. 1 for the purpose of illustrating one of the ways in which my invention can be carried out, the ground and trolley buses 3 and 4, respectively, of a single phase railway power supply system are connected to the track 5 and the trolley 6. The track 5 may be directly connected to the ground bus 3, but the trolley 6 is connected to the trolley bus 4 through a circuit breaker 7 indicated by a rectangle. The circuit breaker 7 may be of any suitable type, and more particularly it may be of the rate-of-change or impulse-trip type, such as disclosed in the previously mentioned McNairy patent. Such circuit breakers commonly have a holding coil 8 whose function is magnetically to maintain the circuit breaker closed after it has once been closed and until such time as the winding is rendered ineffective either by the opening of its circuit or by an opposing flux, as disclosed in the McNairy patent. In order not to have the holding winding continuously energized while the circuit breaker is open, there may be provided a circuit breaker auxiliary switch 9 which is closed when the circuit breaker is closed and opened when the circuit breaker is opened.

Due to the variability in location of the load as well as the magnitude of the load or number of trains and the railway practice of starting whenever ready, there is not only a wide variation in the rate of change of load current, but it may be very high. For example, assuming several trains adjacent a station whose circuit breaker has been opened on a fault and closed after the fault has cleared, every engineer will try to start his train as soon as power is available. This is good railroading. Obviously, the sudden high current demand, which includes large magnetizing currents, would result in tripping unless the rate of rise setting is high. On the other hand, if the setting is high, then the current demand of a high resistance fault or a fault at some distance from the station may readily be of such a character that the circuit breaker is not tripped, although it should be. In accordance with my invention, I provide a protective arrangement whereby to insure, on the occurrence of a fault, the opening of the circuit after the circuit breaker has had time to perform its usual function, but fails to do so, either because the rate of change of current is too small or because there is some electrical failure in the circuit breaker. Again because of the variability in magnitude and position of the load, a high degree of sensitivity is necessary in order to distinguish between loads and faults.

In accordance with my invention, I obtain this high degree of selectivity by two distance responsive relay devices 10 and 11 having different impedance response characteristics. These devices 10 and 11 may be defined respectively as the starting and ohm units of a distance relay. As illustrated in Fig. 1, each of these devices or units comprises a magnetic core or stator 12 having a plurality of inwardly projecting salients 13, 14, 15, and 16, and suitable energizing windings thereon. Centrally disposed with respect to the inner ends of the salients is a magnetic stator 17 and rotatable in the gaps between the ends of the salients and the stator 17 is an electric current conducting element such as a cylindrical member 18 of copper or aluminum, the movement of which controls the actuation of a controlling member 19. This member may be a contact controlling member arranged to close contacts in one position and to be biased from this position against a suitable stop by a light spring 20 sufficient to insure the opening of the member if the associated device is not energized.

The starting unit 10 includes a potential winding, which, as shown, is constituted of four series-connected coils 21 arranged on the outer rim of the stator 12. This potential winding is connected to be energized in accordance with the voltage across the buses 3 and 4 through suitable means such as a potential transformer 22. The salient 16 of the starting unit carries a winding 23 which is connected to be energized in accordance with the current in the trolley 6 through suitable means such as a current transformer 24. For pick-up adjustment purposes, the winding 23 may be provided with taps 25, as shown. The windings 21 and 23 provide a directional torque on the rotor 18 of the starting unit 10 which is proportional to $EI \cos (\phi - \theta_1)$, where $E$ and $I$ are the voltage and the current of the railway circuit at the station, $\phi$ the power factor angle of the railway circuit, and $\theta_1$ the angle between $E$ and $I$ for the maximum sensitivity or torque of the starting unit. It will be observed from the expression for the torque that it is a directional torque. In order that this torque may last for some time after the occurrence of a fault in which the circuit voltage goes substantially to zero, I include in the circuit of the potential windings 21 a condenser 26 so proportioned with respect to the inductance of the potential circuit that this circuit is resonant at power system frequency. In this way, the directional torque is maintained by a so-called "memory" action long enough for the controlling member 19 of the starting unit to close its contacts, even though the voltage has become zero by reason of a nearby dead short-circuit.

In order to obtain the desired distance response characteristic, the starting unit 10 includes another potential winding 27 positioned on the salient 14. The potential windings 21 and 27 cooperate to produce a torque $E^2$ which acts in a direction to hold contacts 19 open. The magnitude of this torque can be controlled within limits by use of suitable means, such as an adjustable resistor 28 in series with the winding 27. The resultant torque on the rotor 18 in the direction to close contacts 19 is then $EI \cos (\phi - \theta_1) - K_1 E^2$, $K_1$ being a constant. At the balance point of the device, the two torques represented by the two terms in this expression will be equal in magnitude and from this equality there is derived the expression $$\frac{I}{E} = \frac{K_1}{\cos (\phi - \theta_1)}$$

In other words, the unit operates to close its contacts 19 when the admittance $$\frac{I}{E}$$

exceeds $$\frac{K_1}{\cos (\phi - \theta_1)}$$

and when $\cos (\phi - \theta_1)$ is positive. The value of $K_1$ is controllable by the resistance 28. This can be expressed in the form of an impedance response characteristic, $$Z_1 = \frac{\cos (\phi - \theta_1)}{K_1}$$

Such a characteristic plots as a circle 30 in the polar diagram of Fig. 2, in which the various concentric light line circles, whose center is at 0, represent ohms impedance and the radial lines leading from 0 different phase angles between the current and the voltage OV which represents the inphase or resistance line, lagging angles being measured clockwise from this line. The diameter of the circle 30 at the angle $\theta_1$ is the maximum impedance at which the starting unit will operate.

When the locomotive transformers are energized, for example, upon the closing of a trolley circuit breaker after clearing a fault, large magnetizing inrush currents occur and, as previously mentioned, these require high settings of the rate of rise trip. Obviously, the protective relay means, which further controls the opening of the circuit breaker, should be able to distinguish between magnetizing inrush currents and actual fault currents. This desired selectivity is provided by the starting unit, since it operates only when the magnitude of the fundamental component of the trolley circuit compared with the voltage of the circuit indicates a fault. Magnetizing inrush currents occur only when the voltage is near normal. Moreover, such currents are composed of many harmonics. In fact, it is common to find that only 40 to 50% of the total R. M. S. value is of fundamental frequency. Consequently, the starting element is only 40 to 50% as sensitive to magnetizing inrush as it is to fault currents. Thus, in the starting unit, the operating torque is obtained by a product of voltage and current, and moreover the circuit of the voltage winding is kept at fundamental frequency by being tuned only for such frequency in order to obtain memory action. The operating torque therefore is dependent on only the fundamental component of the magnetizing inrush current, since the direct current component and higher harmonics cannot combine with the fundamental frequency flux of the potential coil circuit to produce any resultant torque.

The ohm unit 11 measures a component of the impedance of the protected circuit intermediate resistance and reactance. For this purpose, the ohm unit 11 may comprise a current winding which includes four series-connected coils 31, which are on the stator 12 and which are energized from the current transformer 24. In addition to this winding, there is another winding comprising series-connected coils 32 on the salients 14 and 16. These coils 32 are connected to be energized in accordance with the vectorial difference between the potential of the trolley circuit and a voltage proportional to the current in the trolley circuit and leading this current by 90°. In order to control the pick-up of the ohm unit without affecting the power factor setting, the circuit potential may be derived from the potential transformer 22 through a tapped auto-transformer 33. The voltage derived from the current of the circuit may be obtained from a high reactance transformer 34, whose primary winding is connected in series with the current transformer 24. For maximum sensitivity, or power factor, adjustment, the coils 32 have in series therewith a condenser 35 across which is connected a variable resistance 36.

With the illustrated arrangement of winding energizations, the torque of the ohm element on its rotor 18 in a direction to close contacts 19 is $K_2 I^2 - EI \cos (\phi - \theta_2)$, $\theta_2$ being the power factor angle for maximum sensitivity of response and $K_2$ a constant. At the balance point $EI \cos (\phi - \theta_2) = K_2 I^2$, or in terms of its impedance response, $$Z_2 = \frac{K_2}{\cos (\phi - \theta_2)}$$

In other words, the ohm unit closes its contacts when the impedance $Z_2$ is less than $$\frac{K_2}{\cos (\phi - \theta_2)}$$

and $\cos (\phi - \theta_2)$ is positive, $K_2$ being controllable directly by the tapped potential transformer 33 without effecting the phase angle setting $\theta_2$. This characteristic is represented by the straight line 40 in Fig. 2, and the perpendicular from the origin 0 on the line 40 at the angle $\theta_2$ represents the maximum component of impedance at $\theta_2$ lagging for which operation of the ohm unit will occur.

Referring now to Fig. 2, it will be apparent that whenever the impedance $Z_1$ falls within the impedance characteristic or circle 30 of the starting unit 10, this device will operate to close its contacts. Similarly, whenever the circuit impedance falls on the origin side of the impedance characteristic or line 40 of the ohm unit 11, this unit will close its contacts. Consequently, both of the units will operate to close their contacts simultaneously only within the zone of the circle 30 on the origin-of-co-ordinates 0 side of the line 40. This zone may be considered to represent the zone of fault impedances and any impedance outside of this zone may be considered to be the zone of impedances which are normal or for which the opening of the circuit should not be effected. Obviously, by changing the angle $\theta_1$ or $\theta_2$, or both, the range of impedances over which both the starting unit and ohm unit operate, can be varied so as to change the response of the two devices in dependence on the circuit protection desired with respect to the location of trip-effecting impedance values. For example, in Fig. 2, the dots may be considered to represent load impedance values for which no opening of the circuit should take place. On the other hand, the crosses indicate fault impedance values for which opening of the circuit should be effected. Considering these two classes of impedance values; that is, the load and fault types, it will be observed that, by varying either the angle $\theta_1$ or $\theta_2$, or both, the impedance values for which tripping is not desired may be separated from the values for which tripping is necessary. In other words, the position or the magnitude or both of the zone of the circle 30 on the origin side of the characteristic 40 of the ohm unit may be so varied by changing the angle $\theta_1$ or $\theta_2$ or both as selectively to discriminate between impedance values due to the maximum anticipated loads and impedance values due to faults. The values of $\theta_1$ or $\theta_2$ which provide the desired discrimination in any particular circuit or circuit section may be defined as the optimum values for insuring operation on faults and not on loads. It will of course be understood that even the optimum value may have an appreciable range depending upon the nature of the circuit and consequently there is the possibility of encroachment of load impedance values upon fault impedance values. For the starting unit, the optimum value of $\theta_1$ will, in general, be less than the natural power factor angle of the circuit, but I do not wish to limit my invention to specific values of $\theta_1$ and $\theta_2$ since the best values are dependent upon the distribution of the load and fault impedances. In general for transmission lines the natural power factor angle of the circuit may range from 30° lagging to 85° lagging.

Since the impulse trip circuit breaker must be allowed time to perform its desired function, I provide means for delaying the tripping action of the ohm and starting units for the maximum time the impulse-trip should require to function. This means, as shown, comprises an auxiliary relay 41 whose winding is arranged in series with the contacts of the starting and ohm units across a suitable direct current control bus 39. The relay 41 may be of the seal-in type and time delayed to the extent necessary by any suitable means. The time delay may be obtained by a short-circuited winding 42. Since the relay 41 is preferably of the pick-up circuit-closing type, it may be arranged to seal itself in through its contacts 43. Inasmuch as the holding winding 8 is normally to be energized, a circuit opening contact is desired in the circuit of this winding and this may be obtained through a second auxiliary relay 44 whose operation is controlled by the relay 41. For arc-quenching purposes whereby to prevent damage to the contacts of the starting and ohm units, there may be included in circuit therewith the condenser 45 and the resistor 46.

Assuming the parts positioned as shown in Fig. 1 and that abnormal circuit conditions prevail but that the circuit breaker 7 does not open because the rate of rise of current is insufficient, then if the circuit impedance is such as to fall within the zone of the circle 30 and on the origin side 0 of the line 40, both the ohm unit and the starting unit will close their contacts 19 whereby to complete the circuit of the relay 41. If this circuit is maintained closed for the time delay of this relay, it will close its contacts 43 and seal itself in and at the same time complete the circuit of the tripping relay 44 through the contact 47 and one of the contacts 43. Upon energization, the relay 44 opens its contacts in the circuit of the holding winding 8 whereby to effect the opening of the circuit breaker 7, which upon opening opens its auxiliary switch 9 so that subsequent de-energization of the relay 44 will not maintain the holding circuit energized unless the circuit breaker is closed. If on the other hand, the abnormal circuit conditions are of such a character that the impedance falls outside of the circle 30, the starting unit 10 cannot close its contacts. Moreover, if the impedance falls on the side of the line 40 opposite the origin 0, then the ohm unit 11 cannot close its contacts. Consequently, the circuit breaker 7 will not be tripped.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an alternating current circuit, means for interrupting said circuit, two distance responsive relay devices each having current and voltage windings connected to be energized from said circuit, one of said devices having an impedance response characteristic $$Z_1 = \frac{\cos(\phi - \theta_1)}{K_1}$$

and the other of said devices having an impedance response characteristic $$Z_2 = \frac{K_2}{\cos(\phi - \theta_2)}$$

$\phi$ being the power factor angle of said circuit $\theta_1$ and $\theta_2$ the angles between the current and the voltage of the circuit for maximum sensitivity of response of the respective devices, the values of $\theta_1$ and $\theta_2$ being the optimum values for distinguishing between circuit faults and circuit loads, and $K_1$ and $K_2$ constants, and means responsive to the conjoint action of said two relay devices for controlling said interrupting means.

2. In combination, an alternating current circuit, means for interrupting said circuit and means for controlling the operation of said circuit interrupting means including a relay device having current and voltage windings connected to be energized from said circuit, said device having an impedance response characteristic $$Z_1 = \frac{\cos(\phi - \theta_1)}{K_1}$$

$\phi$ being the power factor angle of said circuit $K_1$ a constant, and $\theta_1$ the angle between the current and voltage of the circuit for maximum sensitivity of response of the device, the value of $\theta_1$ being the optimum value for distinguishing between circuit faults and circuit loads.

3. In combination, an alternating current circuit, means for interrupting said circuit, two distance responsive relay devices each having current and voltage windings connected to be energized from said circuit, one of said devices having an impedance response characteristic $$Z_1 = \frac{\cos(\phi - \theta_1)}{K_1}$$

and the other of said devices having an impedance response characteristic $$Z_2 = \frac{K_2}{\cos(\phi - \theta_2)}$$

$\phi$ being the power factor angle of said circuit, $\theta_1$ and $\theta_2$ the angles between the current and the voltage of the circuit for maximum sensitivity of response of the respective devices, and $K_1$ and $K_2$ constants, means for varying the phase angle of one of said devices whereby to control its sensitivity of response, and means responsive to the conjoint action of said two devices for controlling said interrupting means.

4. In combination, an alternating current circuit, means for interrupting said circuit, and means for controlling the opening of said interrupting means including a distance responsive relay device having current and voltage windings connected to be energized from said circuit, said device having an impedance response characteristic $$Z_2 = \frac{K_2}{\cos(\phi - \theta_2)}$$

$\phi$ being the power factor angle of said circuit, $\theta_2$ the angle between the current and the voltage of the circuit for maximum sensitivity of response of the device, the value of $\phi_2$ being substantially less than 90°, and $K_2$ a constant.

5. In combination, an alternating current circuit, means for interrupting said circuit, two distance responsive relay devices each having current and voltage windings connected to be energized from said circuit, one of said devices having an impedance response characteristic $$Z_1 = \frac{\cos(\phi - \theta_1)}{K_1}$$

and the other of said devices having an impedance response characteristic $$Z_2 = \frac{K_2}{\cos(\phi - \theta_2)}$$

$\phi$ being the power factor angle of said circuit, $\theta_1$ and $\theta_2$ the angles between the current and the voltage of the circuit for maximum sensitivity of response of the respective devices, and $K_1$ and $K_2$ constants, and means for varying the phase angle of said other device whereby to control its maximum sensitivity of response, said means including means for maintaining a constant response effect for a given value of $(\phi - \theta_2)$ irrespective of the maximum sensitivity value $\theta_2$ of the device, and means responsive to the conjoint action of said two relay devices for controlling said interrupting means.

6. In combination, an electric circuit, means connected to be energized from the circuit for interrupting the circuit when the rate of change of an electric quantity of the circuit exceeds a predetermined value, and means for effecting the opening of said circuit when the rate of change of said circuit quantity is insufficient to effect the opening operation of said interrupting means including two fault-responsive impedance-type relay devices connected to be energized in accordance with a circuit current and a circuit voltage, each of said relay devices having a different impedance response characteristic.

7. In combination, an alternating current circuit which is subjected to a predetermined variable load condition of such a character that the minimum impedance of any load closely approaches the impedance of certain faults which may occur on said circuit, means for interrupting said circuit, and means for controlling said interrupting means including a distance relay device having current and voltage windings connected to be energized from said circuit, said device having an impedance response characteristic $$Z_2 = \frac{K_2}{\cos(\phi - \theta_2)}$$

$\phi$ being the power factor angle of said circuit, $\theta_2$ the angle between the current and the voltage of the circuit for the maximum sensitivity of response of the device, and $K_2$ a constant, the value of $\theta_2$ being so chosen that the device has the optimum impedance response characteristic for distinguishing between faults and maximum load conditions obtainable on said circuit.

8. In combination, an alternating current circuit which is subjected to a predetermined variable load condition of such a character that the minimum impedance of any load closely approaches the impedance of certain faults which may occur on said circuit, means for interrupting said circuit, and means for controlling said interrupting means including a distance relay device having current and voltage windings connected to be energized from said circuit, said device having an impedance response characteristic $$Z_1 = \frac{\cos(\phi - \theta_1)}{K_1}$$

$\phi$ being the power factor angle of said circuit, $\theta_1$ the angle between the current and the voltage of the circuit for the maximum sensitivity of response of the device, and $K_1$ a constant, the value of $\theta_1$ being such that the device has the optimum impedance response characteristic for distinguishing between faults and maximum load conditions obtainable on said circuit.

9. In combination, an alternating current circuit which is subjected to a predetermined variable load condition of such a character that the minimum impedance of any load closely approaches the impedance of certain faults which may occur on said circuit, means for interrupting said circuit, and means for controlling said interrupting means including a distance relay device having current and voltage windings connected to be energized from said circuit, said device having an impedance response characteristic $$Z_1 = \frac{\cos(\phi - \theta_1)}{K_1}$$

$\phi$ being the power factor angle of said circuit, $\theta_1$ the angle between the current and the voltage of the circuit for the maximum sensitivity of response of the device, and $K_1$ a constant, the value of $\phi_1$ being substantially less than the natural power factor angle of the circuit.

10. In combination, an electric circuit, means connected to be energized from the circuit for interrupting the circuit within a certain time when the rate of increase of circuit current exceeds a predetermined value, means for effecting the opening of said circuit after the expiration of said time when the rate of increase of circuit current is insufficient to effect the opening operation of said interrupting means including two fault-responsive impedance-type relay devices connected to be energized in accordance with a circuit current and a circuit voltage, each of said relay devices having a different impedance response characteristic, and a time element relay controlled jointly by said relay devices.

11. In combination, an alternating current circuit, means for interrupting said circuit, a holding coil for maintaining said interrupting means in the circuit closing position, two distance responsive relay devices each having current and voltage windings connected to be energized from said circuit and each of said devices having a different impedance response characteristic and a control member operable to a controlling position when the circuit impedance is within the operating range of the respective impedance characteristic, auxiliary means connected to be controlled by said control members after they have been simultaneously in the controlling position for a predetermined time, and means controlled by said auxiliary means for effecting the de-energization of said holding coil.

12. In combination, an alternating current circuit, means for interrupting said circuit, two relay devices each having current and voltage windings connected to be energized from said circuit, one of said devices having an impedance response characteristic $$Z_1 = \frac{\cos(\phi - \theta_1)}{K_1}$$

$\phi$ being the power factor angle of said circuit, $\theta_1$ the angle between the current and the voltage of said circuit for maximum sensitivity of response of said one device and $K_1$ a constant, and means responsive to the conjoint action of said two relay devices for controlling said interrupting means.

13. In combination, an electric circuit, means connected to be energized from the circuit for interrupting the circuit when the rate of change of an electric quantity of the circuit exceeds a predetermined value and means for effecting the opening of said circuit when the rate of change of said circuit quantity is insufficient to effect the opening operation of said interrupting means including a fault-responsive impedance-type relay device connected to be energized in accordance with a circuit current and a circuit voltage, said relay device having an impedance response characteristic $$Z_1 = \frac{\cos(\phi - \theta_1)}{K_1}$$

$\phi$ being the power factor angle of said circuit, $\theta_1$ the angle between the current and the voltage of the circuit for the maximum sensitivity of response of the device and $K_1$ a constant, the value of $\theta_1$ being substantially less than the natural power factor angle of the circuit.

14. In combination, an electric circuit, means connected to be energized from the circuit for interrupting the circuit when the rate of change of an electric quantity of the circuit exceeds a predetermined value and means for effecting the opening of said circuit when the rate of change of said circuit quantity is insufficient to effect the opening operation of said interrupting means including a fault-responsive impedance-type relay device connected to be energized in accordance with a circuit current and a circuit voltage, said relay device having an impedance response characteristic $$Z_1 = \frac{\cos(\phi - \theta_1)}{K_1}$$

$\phi$ being the power factor angle of said circuit, $\theta_1$ the angle between the current and the voltage of the circuit for the maximum sensitivity of response of the device and $K_1$ a constant, the value of $\theta_1$ being substantially less than 90°.

OLIVER C. TRAVER.

Certificate of Correction

Patent No. 2,115,597.　　　　　　　　　　　　　　　　　　　　April 26, 1938.

OLIVER C. TRAVER

It is hereby certified that errors appear in the printed specification of the above numbered patent requiring correction as follows: Page 2, second column, line 22, for "torque $B^2$" read *torque $E^2$*; page 4, second column, line 41, for "$\phi_2$" read $\theta_2$; page 5, first column, line 71, for "$\phi_1$" read $\theta_1$; and that the said Letters Patent should be read with these corrections therein that the same may conform to the record of the case in the Patent Office.

Signed and sealed this 30th day of November, A. D. 1943.

[SEAL]

HENRY VAN ARSDALE,
*Acting Commissioner of Patents.*